United States Patent
Kung

(10) Patent No.: US 11,102,292 B2
(45) Date of Patent: *Aug. 24, 2021

(54) SYSTEM AND METHOD FOR REAL-TIME CLOUD DATA SYNCHRONIZATION USING A DATABASE BINARY LOG

(71) Applicant: Zuora, Inc., Redwood City, CA (US)

(72) Inventor: Tinglan Kung, San Jose, CA (US)

(73) Assignee: Zuora, Inc., Redwood City, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 16/399,229

(22) Filed: Apr. 30, 2019

(65) Prior Publication Data

US 2019/0268412 A1    Aug. 29, 2019

Related U.S. Application Data

(63) Continuation of application No. 15/132,168, filed on Apr. 18, 2016, now Pat. No. 10,277,672.

(Continued)

(51) Int. Cl.
| | |
|---|---|
| *H04L 29/06* | (2006.01) |
| *G06F 16/18* | (2019.01) |
| *G06F 16/23* | (2019.01) |
| *G06F 16/2455* | (2019.01) |
| *H04L 29/08* | (2006.01) |

(52) U.S. Cl.
CPC ...... *H04L 67/1095* (2013.01); *G06F 16/1865* (2019.01); *G06F 16/2358* (2019.01);
(Continued)

(58) Field of Classification Search
CPC .......... G06F 16/24573; G06F 16/2358; G06F 16/288; G06F 16/245; G06F 16/81;
(Continued)

(56) References Cited

U.S. PATENT DOCUMENTS

| | | | |
|---|---|---|---|
| 5,758,355 A | 5/1998 | Buchanan | |
| 8,046,327 B2 * | 10/2011 | Brodersen | G06F 16/278 707/615 |

(Continued)

OTHER PUBLICATIONS

International Application No. PCT/US2016/028176, International Search Report and Written Opinion dated Aug. 12, 2016.

(Continued)

*Primary Examiner* — Angelica Ruiz
(74) *Attorney, Agent, or Firm* — Sheppard, Mullin, Richter & Hampton LLP

(57) ABSTRACT

A system synchronizes change-data in a multi-tenant system with one or more external service provider systems. The system comprises a system interface configured to receive transaction events; a write-optimized transactional database for recording the transaction events; a replicated read-optimized transactional database; a transaction log of change-data generated from the read-optimized transactional database; a first change-data processor configured to identify the change-data in the transaction log that is relevant to at least one external service provider system, and to generate an aggregate relevant change-data log; a second change-data processor configured to identify aggregate relevant change-data that is relevant to a particular external service provider system, and to generate a service provider relevant change-data log; a service provider connector configured to await a real-time trigger condition, and to, in response to the trigger condition, perform a synchronization session to synchronize the service provider relevant change-data with the particular external service provider system.

20 Claims, 10 Drawing Sheets

Related U.S. Application Data

(60) Provisional application No. 62/149,473, filed on Apr. 17, 2015.

(52) U.S. Cl.
CPC .... *G06F 16/2365* (2019.01); *G06F 16/24565* (2019.01); *H04L 67/14* (2013.01)

(58) Field of Classification Search
CPC ...... G06F 16/283; G06F 16/955; G06F 21/10; G06F 16/2365; G06F 8/10
See application file for complete search history.

(56) References Cited

U.S. PATENT DOCUMENTS

| | | | |
|---|---|---|---|
| 8,818,940 B2* | 8/2014 | Lai | G06F 16/2358 707/618 |
| 2005/0114285 A1 | 5/2005 | Cincotta | |
| 2010/0235837 A1 | 9/2010 | Weissman | |
| 2012/0197907 A1 | 8/2012 | Malyshev | |
| 2014/0201357 A1 | 7/2014 | Tang | |
| 2014/0244447 A1 | 8/2014 | Kim | |
| 2014/0244488 A1 | 8/2014 | Kim | |
| 2016/0294655 A1 | 10/2016 | Lin | |

OTHER PUBLICATIONS

Vyzas, Nikolaos, "Tungsten Replicator: MariaDB Master-Master and Master-Slave Topologies," blog post on Pythian Group Inc. website, Aug. 28, 2014 [retrieved at https://www.pythian.com/blog/tungsten-replicator-mariadb-master-master-and-master-slave-topologies/ on Nov. 18, 2016].

* cited by examiner

SYSTEM AND METHOD FOR REAL-TIME CLOUD DATA SYNCHRONIZATION USING A DATABASE BINARY LOG

CROSS-REFERENCE TO RELATED APPLICATIONS

This application is a continuation of U.S. patent application Ser. No. 15/132,168 filed Apr. 18, 2016 and entitled "System and Method for Real-time Cloud Data Synchronization Using Database Binary Log," now U.S. Pat. No. 10,277,672, which claims priority to U.S. Provisional Patent Application Ser. No. 62/149,473 filed Apr. 17, 2015 and entitled "System and Method for Real-time Cloud Data Synchronization Using Database Binary Log," which are hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Certain multi-tenant systems, e.g., billing systems, create millions of transactions on a daily basis. In certain circumstances, external (e.g., third party) systems may need the transaction information maintained by the multi-tenant systems to perform their services, e.g., data storage, data analysis, billing, report generation, etc.

SUMMARY

In some embodiments, the present invention provides a method of synchronizing change-data in a multi-tenant system with one or more external service provider systems, the method comprising receiving transaction events in a write-optimized transactional database of a multi-tenant system; replicating the transaction events in a read-optimized transactional database; generating a transaction log of change-data from the read-optimized transactional database; extracting, by a first change-data processor, the change-data from the transaction log; identifying, by the first change-data processor, the change-data in the transaction log that is relevant to at least one of one or more external service provider systems; generating an aggregate relevant change-data log; extracting, by a second change-data processor, the aggregate relevant change-data from the aggregate relevant change-data log, the second change-data processor being associated with a particular external service provider system of the one or more external service provider systems; identifying, by a second change-data processor, the change-data in the aggregate relevant change-data log that is relevant to the particular external service provider system; generating a service provider relevant change-data log; awaiting a trigger condition of one or more trigger conditions, at least one of the one or more trigger conditions including a real-time trigger condition; and in response to the trigger condition, performing a synchronization session to synchronize the service provider relevant change-data with the particular external service provider system.

In some embodiments, the present invention provides a system for synchronizing change-data in a multi-tenant system with one or more external service provider systems, the method comprising a system interface of a multi-tenant system configured to receive transaction events; a write-optimized transactional database for recording the transaction events; a read-optimized transactional database that is replicated from the write-optimized transactional database; a transaction log of change-data that is generated from the read-optimized transactional database; a first change-data processor configured to extract the change-data from the transaction log, and to identify the change-data in the transaction log that is relevant to at least one of one or more external service provider systems, and to generate an aggregate relevant change-data log; a second change-data processor configured to extract the aggregate relevant change-data from the aggregate relevant change-data log, the second change-data processor being associated with a particular external the change-data in the aggregate relevant change-data log that is relevant to the particular external service provider system, and to generate a service provider relevant change-data log; a service provider connector configure to await a trigger condition of one or more trigger conditions, at least one of the one or more trigger conditions including a real-time trigger condition, and to, in response to the trigger condition, perform a synchronization session to synchronize the service provider relevant change-data with the particular external service provider system.

In some embodiments, the multi-tenant system may be a subscription billing system, and the particular external service provider system may be one of a data warehouse system, a customer relationship management system or a data analysis system. The transaction log may be a binary log. The binary log may be a row-based binary log. The first change-data processor may include a master stage of a tungsten replicator. The second change-data processor may include a slave stage of the tungsten replicator. The trigger condition may include a real-time trigger condition. The one or more trigger conditions may include a first trigger condition based on the number of data changes that occurred, and a second trigger condition based on a clock-based time schedule. The one or more external service provider systems may include two particular external service provider systems, and each of the two particular external service provider systems may have different trigger conditions. The particular external service provider system may have an API-call limit, and the trigger condition may be configured to account for the API-call limit.

DETAILED DESCRIPTION

Figure 1:
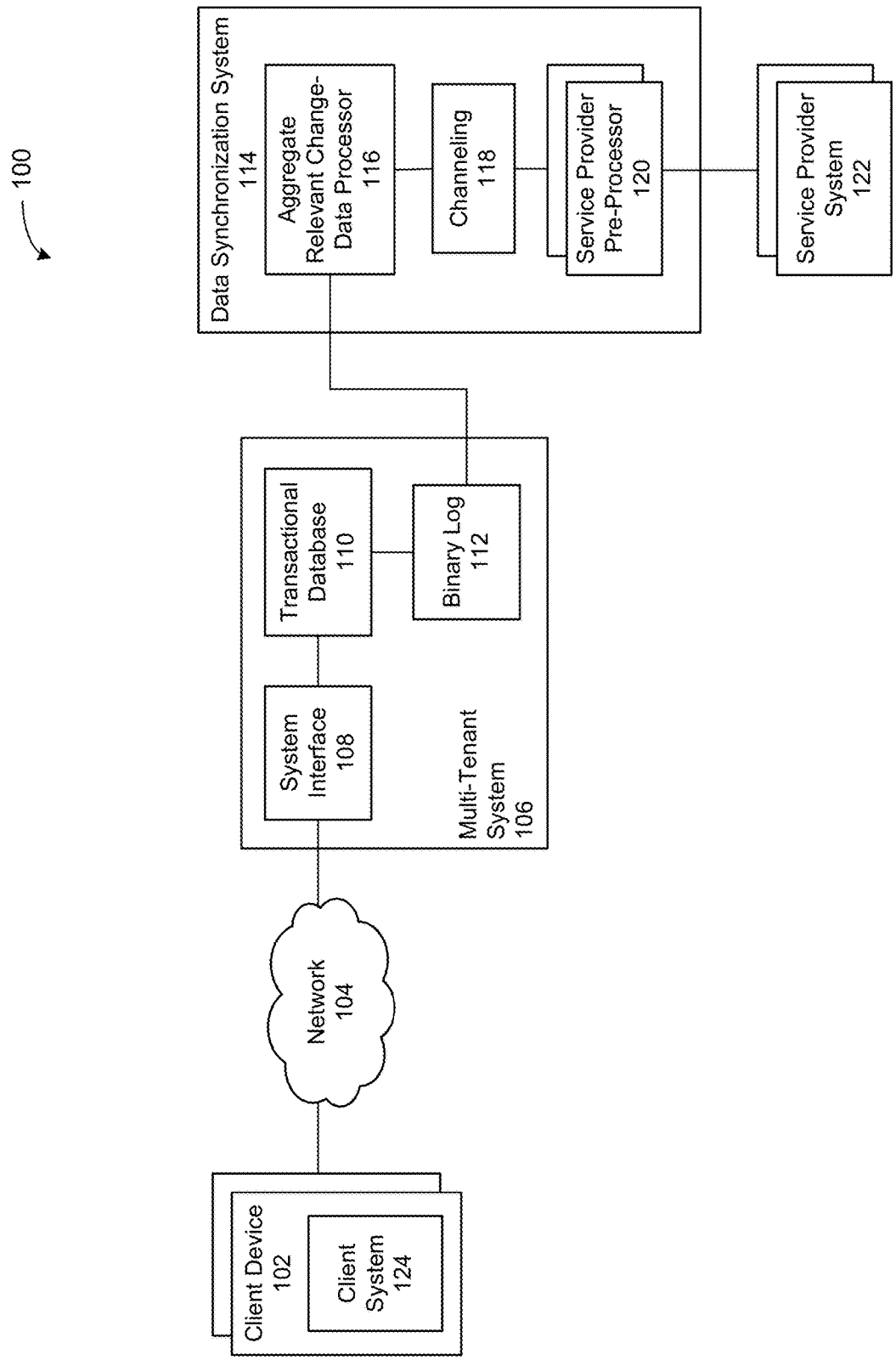
FIG. 1 is a block diagram illustrating a network system for providing shared services to multiple tenants and for synchronizing change-data with external service provider systems, in accordance with some embodiments of the invention.

FIG. 1 is a block diagram illustrating a network system 100 for hosting shared services for one or more tenants and for synchronizing change-data with external service providers 122, in accordance with some embodiments of the invention. The network system 100 includes a multi-tenant system 106 configured to host shared services for one or more tenants and includes a data synchronization system 114 configured to synchronize relevant data changes made in the multi-tenant system 106 (change-data) with one or more external service provider systems 122. In some embodiments, the data synchronization system 114 may synchronize the relevant change-data in near real-time.

The multi-tenant system 106 includes hardware, software and/or firmware configured to host the shared services for the one or more tenants. The hosted services may include tenant-specific business services or functions, including enterprise resource planning (ERP), customer relationship management (CRM), eCommerce, Human Resources (HR) management, payroll, financials, accounting, calendaring, order processing, billing, subscription billing, inventory management, supply chain management (SCM), collaboration, sales force automation (SFA), marketing automation, contact list management, call-center support, web-based customer support, partner and vendor management systems, product lifecycle management (PLM), reporting and analysis, etc.

Each tenant may include a group of one or more users, e.g., individuals, business entities, customers of the business entities, systems, and/or the like, who share access to the hosted services. In one embodiment, the multi-tenant system 106 provides subscription-based billing services to several tenants, and each tenant includes a service entity (such as AT&T, Netflix, Verizon, Hulu, etc.) and/or the customers of the service entity. It will be appreciated that the typical multi-tenant system 106 is configured to offer multi-user access to shared applications on shared devices and to offer each the same quality of service. That is, the typical multi-tenant system 106 does not use virtualization or instantiation processes, and does not vary quality of service among different tenants, although such features are possible in some embodiments. In some embodiments, a multi-tenant system 106 integrates several business computing systems into a common system with a view toward streamlining business processes and increasing efficiencies on a business-wide level.

The network system 100 further includes one or more client devices 102 coupled via a network 104 (e.g., a set of one or more public and/or private, wired and/or wireless networks) to the multi-tenant system 106. Each of the client devices 102 includes a client system 124 configured to provide access to the shared services hosted by the multi-tenant system 106. Each client device 102 may include a desktop, laptop, notebook, tablet, personal digital assistant, smart phone, or other consumer electronic devices incorporating one or more computer components. The client system 124 on each client device 102 may include hardware, software and/or firmware configured to communicate with the multi-tenant system 106 and to access the shared services hosted thereby. Examples of the client systems 124 may include web browsers, client engines, drivers, user interface components, proprietary interfaces, etc. Each client device 102 may be used by a tenant.

In some embodiments, the multi-tenant system 106 includes a system interface 108 that includes one or more graphical user interfaces and/or one or more web-based interfaces to enable tenants to access the shared services hosted by the multi-tenant system 106. The system interface 108 may be configured to interface with the client systems 124. The system interface 108 may support load balancing when multiple tenants try to access the multi-tenant system 106 concurrently. The system interface 108 may additionally or alternatively include an operator interface for use by a systems operator to configure or otherwise manage the multi-tenant system 106.

In some embodiments, the multi-tenant system 106 further includes a transactional database 110. In some embodiments, the transactional database 110 stores tenant data for each tenant in one or more logical stores within a transactional database 110. Each logical store may contain tenant data that is used, generated and/or stored as part of providing tenant-specific business services or functions. The transactional database 110 may be implemented using any suitable data storage technology, including structured query language (SQL) based relational database management systems (RDBMS).

In some embodiments, the transactional database 110 includes hardware, software and/or firmware to generate a binary log 112. The binary log 112 includes a log of all transaction events (e.g., shared service functions), including all change-data reflecting changes (e.g., creations, replacements, updates, deletions, etc.) made to the logical stores within the transaction database 110. In some embodiments, the binary log 112 includes all changes for all tenants and is maintained in binary. In some embodiments, the binary log 112 has a retention period of a limited time period, e.g., five days. In some embodiments, the retention period is unlimited or substantially longer such as one year.

The data synchronization system 114 includes hardware, software and/or firmware configured to synchronize relevant change-data with one or more external service provider systems 122. In some embodiments, the change-data may reflect changes to subscription billing accounts, and the external service providers may include data warehouse systems, financial analysis and reporting systems, customer relationship management systems, etc.

The data synchronization system 114 includes an aggregate relevant change-data processor 116 coupled to channeling 118, which is in turn coupled to a service provider pre-processor 120. The aggregate relevant change-data processor 116 includes hardware, software and/or firmware configured to extract change-data relevant to the group of one or more external service provider systems 122 from the binary log 112. In some embodiments, the aggregate relevant change-data processor 116 may identify and store only the change-data that is relevant to the service provider systems 122. The channeling 118 includes communications channels for providing the relevant change-data to the one or more service provider pre-processors 120. Each service provider pre-processor 120 includes hardware, software and/or firmware configured to extract only the change-data relevant to its associated external service provider system 122, to translate the change-data relevant to its associated service provider system 122 to the format and protocol suitable for the service provider system 122, and to communicate the translated relevant change-data to its associated service provider system 122.

In some embodiments, each service provider pre-processor 120 may synchronize the change-data in response to a trigger condition, which may include a user request, occurrence of one or more scheduled events (e.g., at specific clock times, every 24 hours, etc.), and/or occurrence of one or more real-time factors. In some embodiments, the trigger conditions may be selected based on the particular service provider system 122. The trigger condition may be based on time of day, may be based on the number of API calls available, may be based on the number of change-data events, and/or may be based on the current load on the multi-tenant system 106 or on the service provider system 122.

It will be appreciated that capturing change data from large transaction database 110 using the binary log 112 means minimal impact on the transactional database 110, no change to the transactional database schema, and/or transactional integrity. Further, as discussed in greater detail below, in some embodiments, using the binary log 112 also supports using a single master and multiple slave replication topology, so that a single data source can be replicated to multiple target systems. In some embodiments, the transaction log which stores the change-data need not be binary.

Another way of capturing change-data from a large transactional database 110 is based on using audit fields. Using audit fields typically involves querying the change-data using the Update Date or Create Date fields and is normally pull-based data integration, not real-time or near real-time. Because large database tables are usually scanned for only a few record changes and the Update Date or Create Date fields are rarely indexed, this approach may be less efficient and less scalable. Further, this approach is dependent on applications that are able to reliably update the audit fields.

Another way of capturing change-data from a large transactional database 110 is based on using database triggers. This approach is relatively simple to implement and tightly coupled to the source system. However, when database triggers fail, the source transaction also fails so that a data capture or transformation failure will often require the rolling back of an entire transaction. This approach often requires database schema changes, which makes it difficult to maintain. Also, database triggers are normally executed synchronously with the transaction, and thus the transaction performance of the database systems may degrade.

Figure 2:
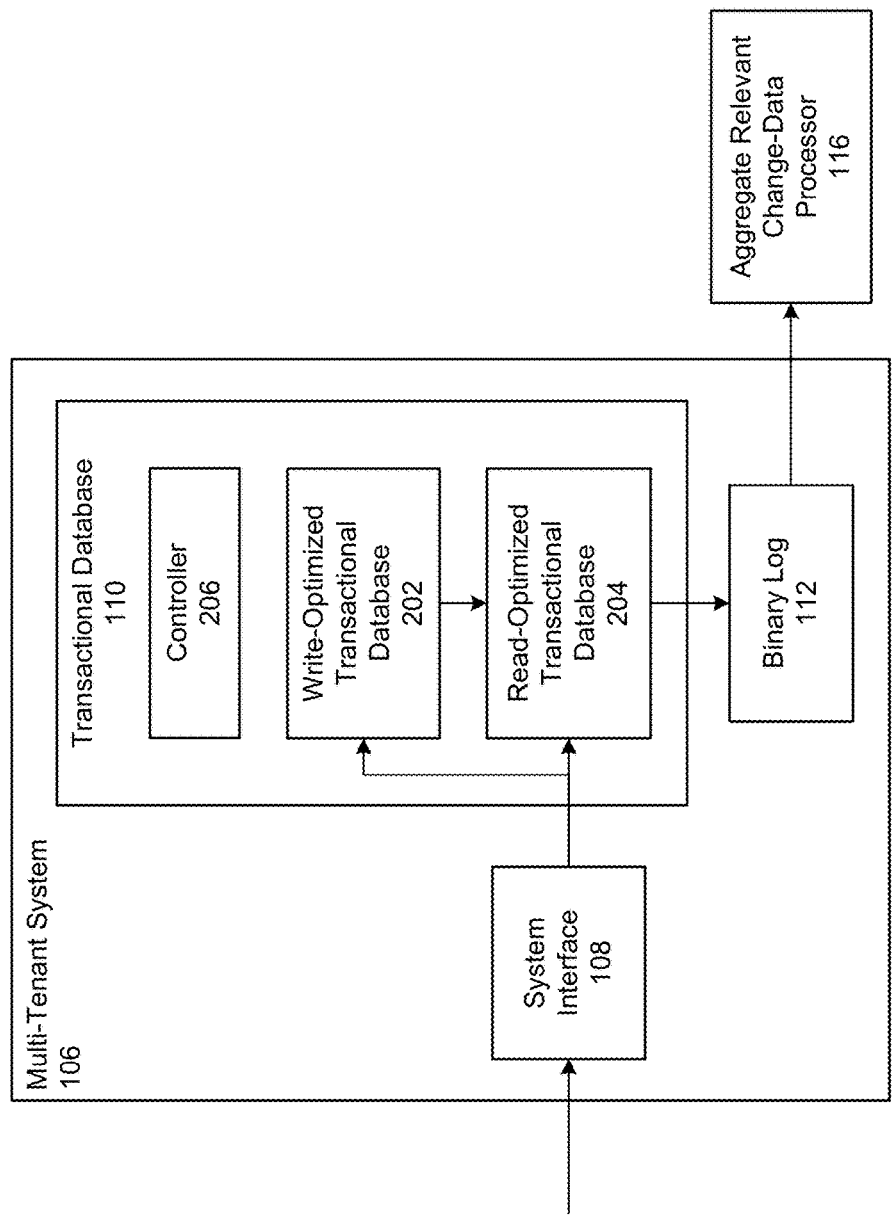
FIG. 2 is a block diagram illustrating details of the multi-tenant system, in accordance with some embodiments of the invention.

FIG. 2 is a block diagram illustrating details of the multi-tenant system 106, in accordance with some embodiments of the invention. In some embodiments, the transaction database 110 includes a write-optimized transactional database 202 coupled to a read-optimized transactional database 204. In some embodiments, the transaction database 110 includes a controller 206 for replicating the write-optimized transactional database 202 to generate the read-optimized transactional database 204. Tenants, through the system interface 108, may write to the write-optimized transactional database 202 and/or read from the read-optimized transactional database 204. In some embodiments, the controller 206 records the write events (create, replace, update, delete, etc.) made to the write-optimized transactional database 202 and/or read events from the read-optimized transaction database 204 in the binary log 112.

In some embodiments, the write-optimized transactional database 202 may be replicated to produce the read-optimized transactional database 204, and the binary log 112 may be produced from the read-optimized transactional database 204, wherein the changed data is captured. Because in some embodiments the binary log is produced from the read-optimized transactional database 204, there is little to no impact on the performance of the write-optimized transactional database 202, which continues to process transaction events.

In some embodiments, the transactional database 110 may include multiple read-optimized transactional databases 204. In some embodiments, each read-optimized transactional database 204 may include a dedicated aggregate relevant change-data processor 116. In some embodiments, a single aggregate relevant change-data processor 116 may cooperate with all the read-optimized transactional databases 204.

Figure 3:
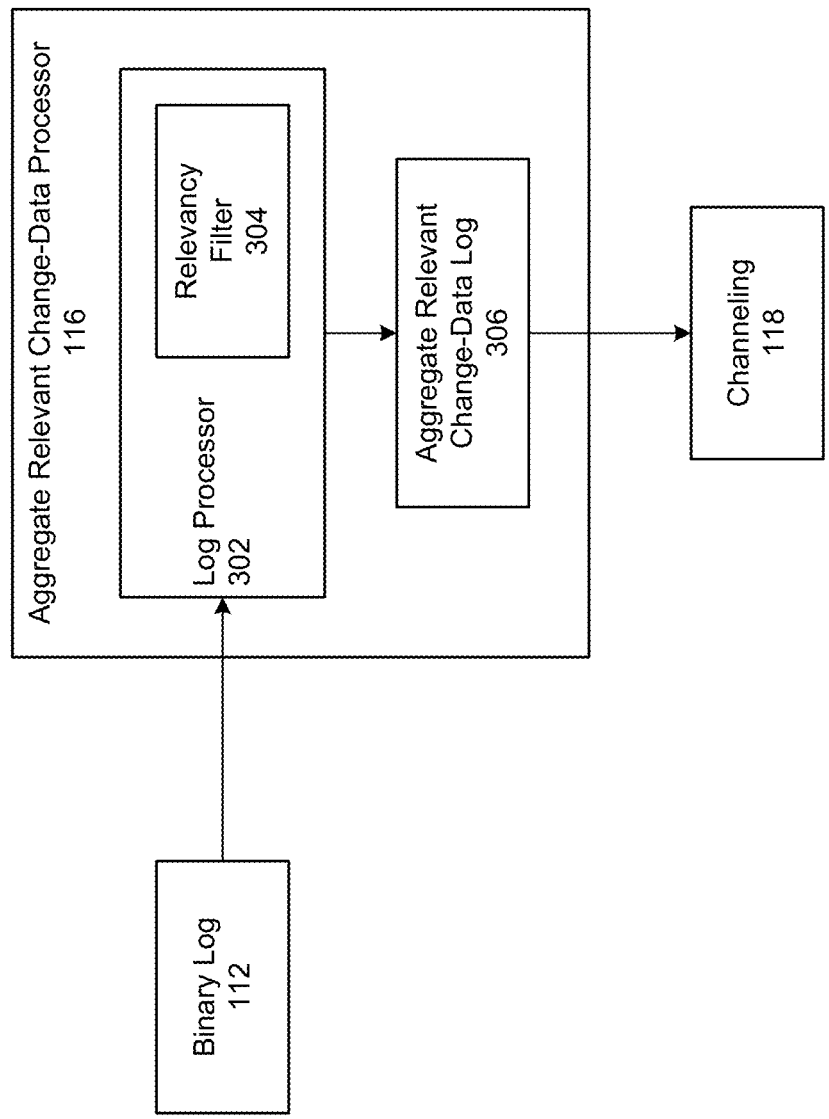
FIG. 3 is a block diagram illustrating details of the aggregate relevant change-data processor, in accordance with some embodiments of the invention.

FIG. 3 is a block diagram illustrating details of the aggregate relevant change-data processor 116, in accordance with some embodiments of the invention. In some embodiments, the aggregate relevant change-data processor 116 includes a log processor 302 with a relevancy filter 304 that generates an aggregate relevant change-data log 306. The log processor 302 includes hardware, software and/or firmware configured to access the binary log 112, to use the relevancy filter 304 to capture change-data that is relevant to the external service provider systems 122, and to generate aggregate relevant change-data in a format (e.g., text) that is more usable than the binary format of the binary log 112. The retention period of the aggregate relevant change-data log 306 may be the same retention period as the binary log 112, e.g., five days. In some embodiments, the retention period of the aggregate relevant change-data log 306 may be more or less than the retention period of the binary log 112.

In some embodiments, it will be appreciated that the binary log 112 may utilize row-based logging for change-data capture to obtain row-level data changes for every transaction. The binary log processor 302 may filter the row-level data changes to obtain the subset of the data changes relevant to one or more of the external service provider systems 122 (and thus relevant for data synchronization). For each non-global shard, a write-optimized transactional database 202 may be synchronously replicated via statement-based replication (SBR) to the read-optimized transactional database 204. In some embodiments, to get row-level changes in the binary log 112, the statement-based replication may be replaced with row-based replication (RBR). Alternatively, to minimize impact, row-based logging (RBL) may be replicated on the read-optimized transactional database 204.

Because generation of the binary log 112 is asynchronous with the generation of the aggregate relevant change-data log 306, it may have low impact on the performance of the transactional database 110. It is efficient because it is focuses only on the change-data. It is transaction integral because each record change in the binary log 112 is associated with a database transaction identifier, so it permits data to synchronize with the transaction boundary without leaving data in a partial state. Further, log reading may be retried, so that data capture or transformation failures do not require the transaction to be backed out.

Figure 4:
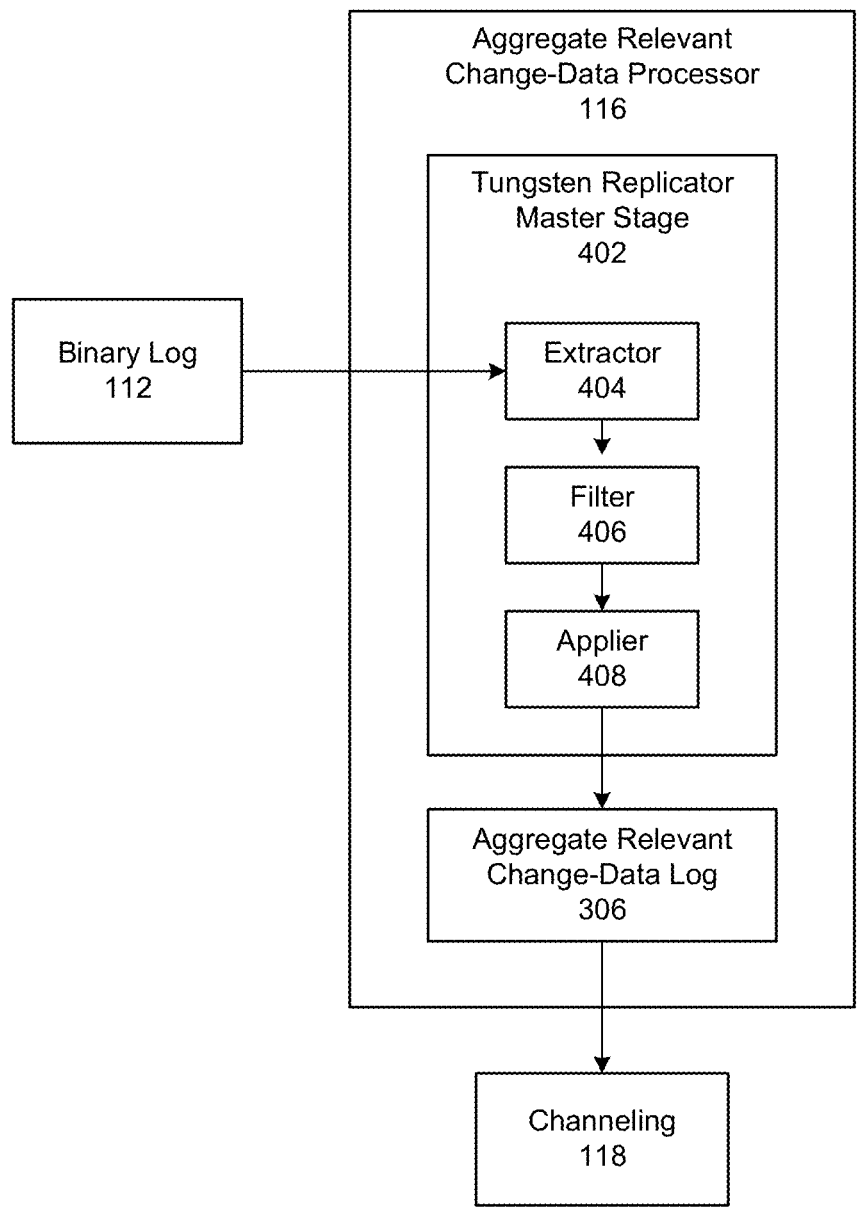
FIG. 4 is a block diagram illustrating details of the aggregate relevant change-data processor, in accordance with some embodiments of the invention.

FIG. 4 is a block diagram illustrating details of the aggregate relevant change-data processor 116, in accordance with some embodiments of the invention. In some embodiments, the aggregate relevant change-data processor 302 may be implemented using the master stage 402 of a tungsten replicator. The tungsten replicator master stage 402 includes an extractor 404 configured to extract the change-data from the binary log 112, a filter 406 configured to identify only the change-data that is relevant to at least one of the external service provider systems 122, and an applier 408 configured to generate the aggregate relevant change-data log 306 in a readable format (e.g., text). In some embodiments, the filter 406 removes transaction events that are not relevant to any external provider system 122. The applier 408 may be responsible for maintaining the change-data in the aggregate relevant change-data log 306 for the set retention period. In some embodiments, the tungsten replicator master stage 402 may be implemented on the same server as the read-optimized transactional database 204.

Figure 5:
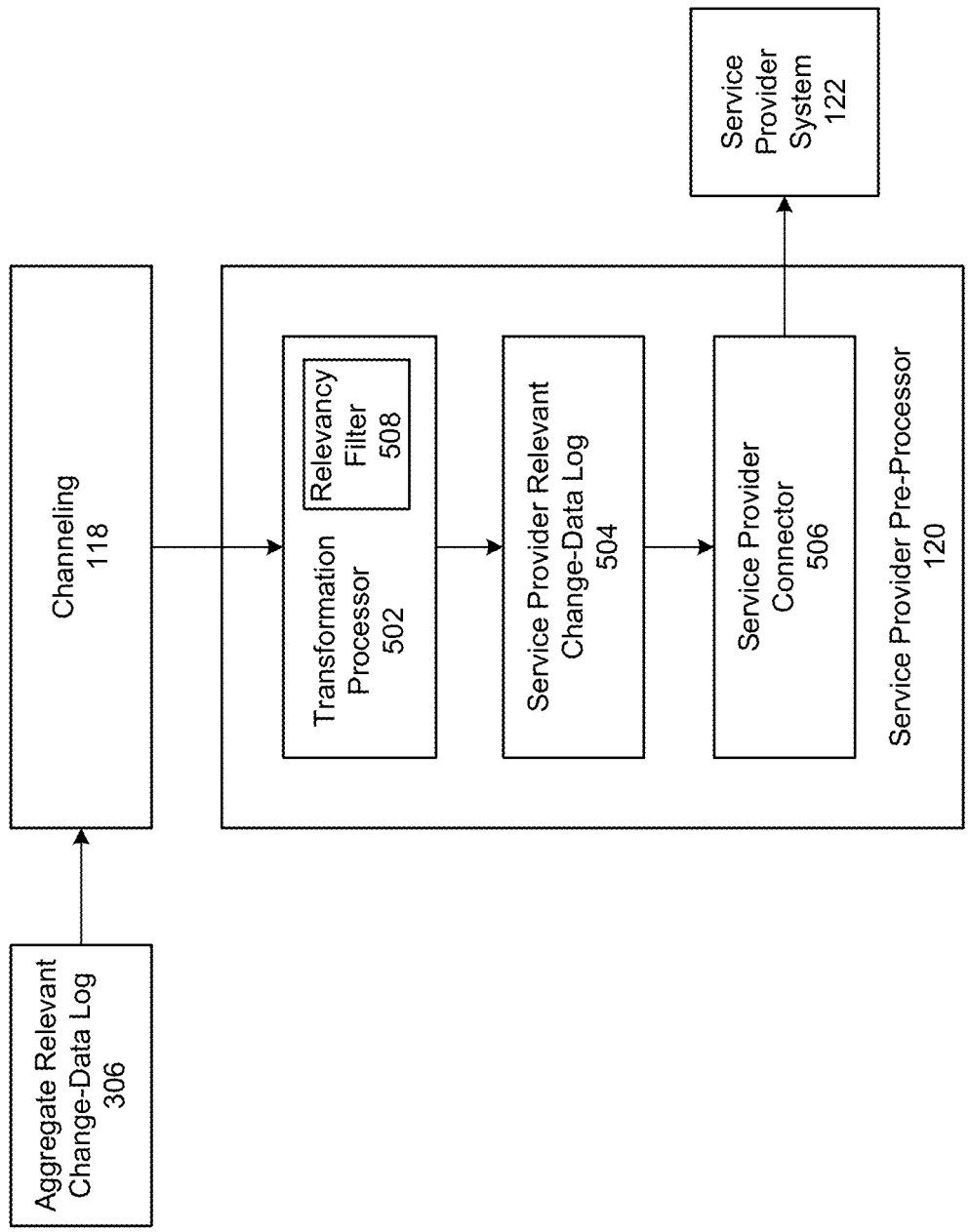
FIG. 5 is a block diagram illustrating details of the service provider pre-processor, in accordance with some embodiments of the invention.

FIG. 5 is a block diagram illustrating details of the service provider pre-processor 120, in accordance with some embodiments of the invention. In some embodiments, the service provider pre-processor 120 includes a transformation processor 502 with a relevancy filter 508 that generates a service provider relevant change-data log 504, and a service provider connector 506 for communicating the relevant change-data with its associated service provider system 122. In some embodiments, the transformation processor 502 includes hardware, software and/or firmware configured to access the aggregate relevant change-data log 306 to extract the aggregate change-data, to use the relevancy filter 508 to identify change-data that is relevant to the associated external service provider system 122, and to generate service provider relevant change-data in a format that is more usable by the external service provider system 122. The retention period of the service provider relevant change-data log 504 may be the same retention period as the binary log 112 or the same as the aggregate relevant change-data log 306. In some embodiments, the retention period of the service provider relevant change-data log 504 may be more or less than the retention period of the binary log 112. In some embodiments, the retention period of the service provider relevant change-data log 504 is five hours.

Because generation of the service provider relevant change-data log 504 for each external service provider system 122 is asynchronous with the generation of the aggregate relevant change-data log 306 and asynchronous with the generation of the service provider relevant change-data log 504 for other external service provider system 122, the solution may have low impact on the overall system. The solution may enable each service provider pre-processor 120 to have different synchronization triggers and thus a different synchronization schedule that is focused on the needs of each external service provider system 122.

Figure 6:
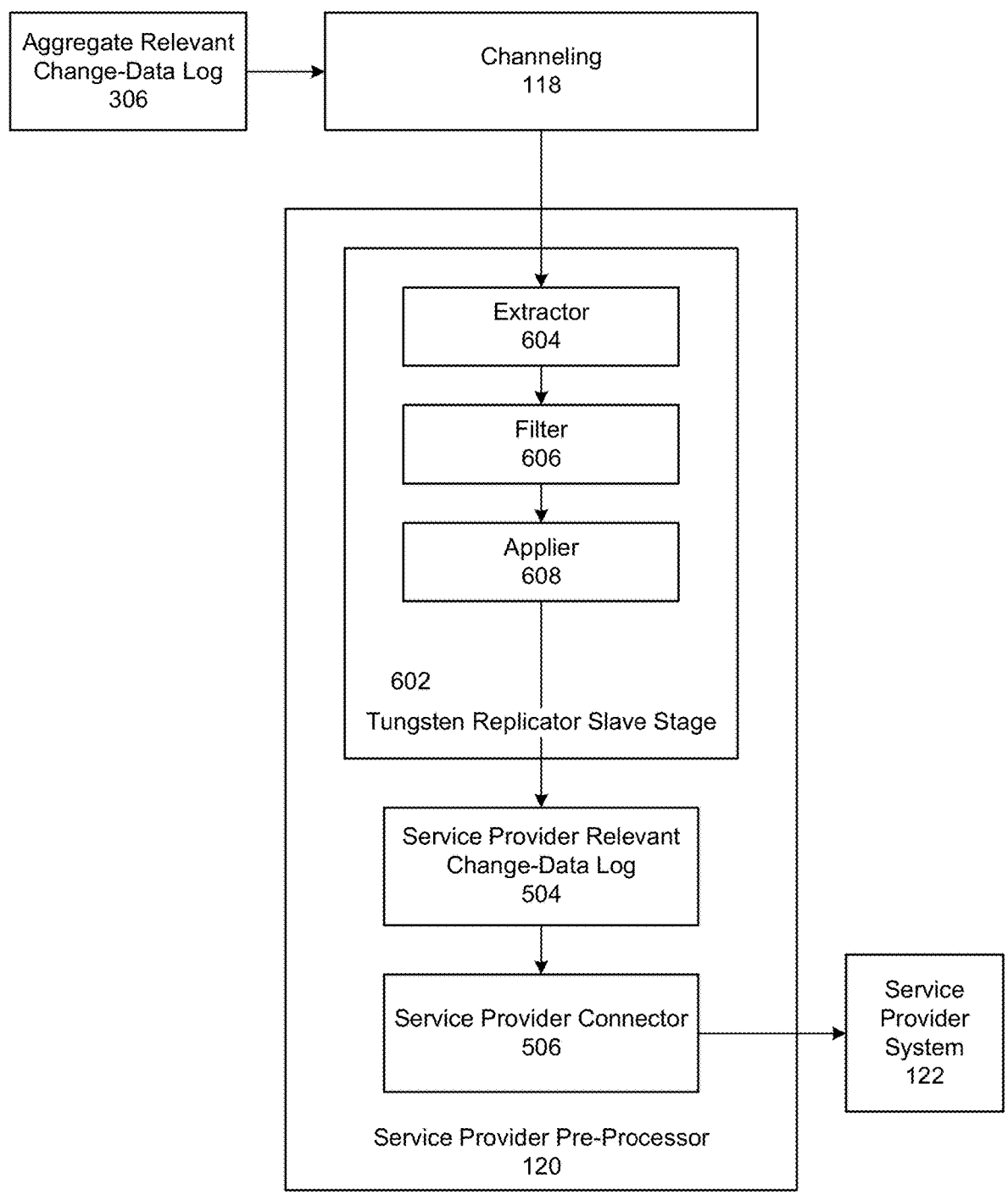
FIG. 6 is a block diagram illustrating details of the service provider pre-processor, in accordance with some embodiments of the invention.

FIG. 6 is a block diagram illustrating details of the service provider pre-processor, in accordance with some embodiments of the invention. In some embodiments, the service provider pre-processor 120 may be implemented using the slave stage 602 of a tungsten replicator. The tungsten replicator slave stage 602 includes an extractor 604 configured to extract the change-data from the aggregate relevant change-data log 306, a filter 606 configured to identify only the change-data that is relevant to the associated external service provider system 122, and an applier 608 configured to generate the service provider relevant change-data log 504 in a format and protocol convenient for the associated service provider system 122. In some embodiments, the filter 606 removes transaction events that are not relevant to the associated external provider system 122. The applier 608 may be responsible for maintaining the change-data in the service provider relevant change-data log 504 for the set retention period.

To support multiple external service provider systems 122, tungsten replicator master stage 402 may be implemented with multiple tungsten replicator slave stages 602. The tungsten replicator master stage 402 maintains responsibility for processing the change-data from the binary log 112, filtering out records that are not relevant to any external service provider systems 122, and producing an aggregate relevant change-data log 306 as the output. Each tungsten replicator slave stage 602 may maintain responsibility for further filtering the aggregate relevant change-data 306 to produce the service provider relevant change-data log 504, transforming the service provider relevant change-data for the associated external service provider system 122, and applying the transformed service provider relevant change-data to its associated external service provider system 122. In some embodiments, each tungsten replicator slave stage 602 may be implemented on a virtual machine that resides on a different machine than the tungsten replicator master stage 402.

Figure 7:
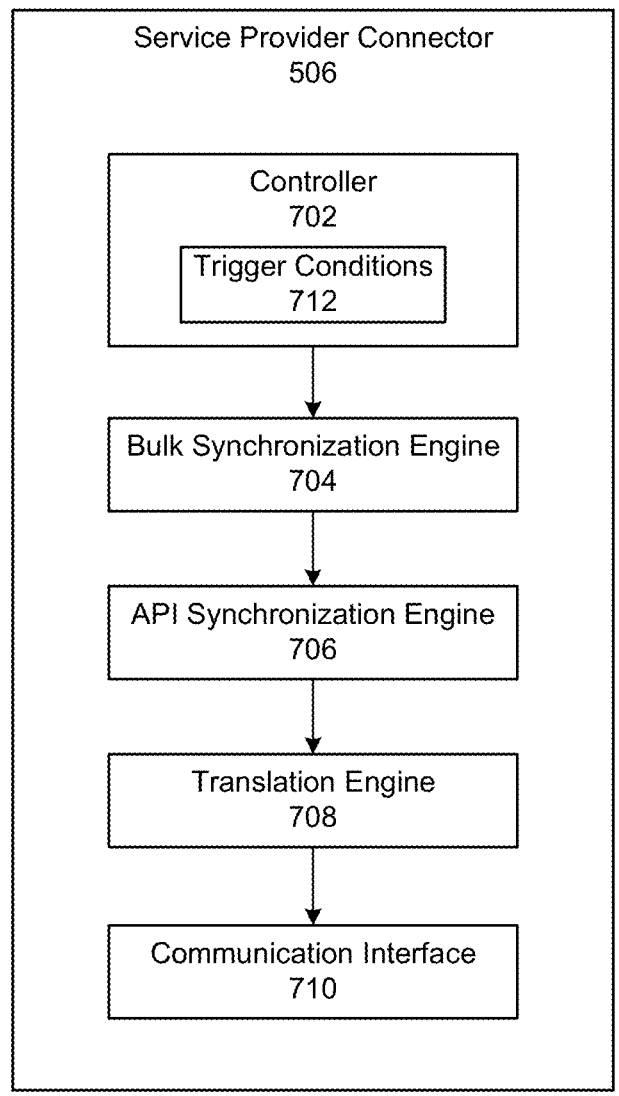
FIG. 7 is a block diagram illustrating details of the service provider connector, in accordance with some embodiments of the invention.

FIG. 7 is a block diagram illustrating details of the service provider connector 506, in accordance with some embodiments of the invention. In some embodiments, the service provider connector 506 includes a controller 702, a bulk synchronization engine 704, an application program interface (API) synchronization engine 706, a translation engine 708, and a communication interface 710. The controller 702 includes hardware, software and/or firmware configured to use trigger conditions 712 to initiate a synchronization session. As stated above, the trigger conditions may include a user request, occurrence of one or more scheduled events (e.g., at specific clock times, every 24 hours, etc.), and/or occurrence of one or more real-time factors. In some embodiments, the trigger conditions may be selected based on the particular service provider system 122. The trigger condition may be based on time of day, may be based on the number of API calls available, may be based on the number of change-data events, and/or may be based on the current load on the multi-tenant system 106 or on the service provider system 122.

In some embodiments, the controller may initiate a synchronization session based on trigger conditions that specify one or more real-time factors. For example, the controller 702 may initiate a synchronization session when a predetermined configurable count of change-data events occurs. In another example, the controller 702 may initiate a synchronization session in a near real-time mode, e.g., when either of the following trigger conditions is met, whichever comes first:

1. Number of Change-Data Events Between Synchronization Sessions

This condition measures how many data-changes occurred in real time. Example values include 1, 5, 10, 20, 30, 40, 50, 100, 200, 300, 400, 500. If the count value is set to 1, then the service provider pre-processor 120 will synchronize change-data after every data change, i.e., in real time. If the value is set to 5, then the service provider pre-processor 120 will synchronize the change-data after five data changes have been made. If creating a subscription (or some other tenant process) causes five change-data events, then the service provider pre-processor 120 will be configured to synchronize at least whenever a subscription is created.

2. Time Between Synchronization Sessions

This condition measures the time between two synchronization sessions. If the number of change-data events (trigger condition #1) is not met, e.g., in less-busy hours, the service provider pre-processor 120 will still trigger a synchronization session when the predetermined configurable time period since the last synchronization session has elapsed. For example, if the time period is set to 30 minutes, and if the number of change-data events has not occurred, and if the last synchronization session occurred at 10:00 am, then the service provider pre-processor 120 will initiate a synchronization session at 10:30 am.

In some embodiments, the trigger conditions are designed to account for resource limits (e.g., API-call limits) associated with the external service provider systems 122. For example, some external service providers such as Salesforce.com limits the number of API calls, e.g., to 1000 API calls per day. Because different access protocols consume a different number of API calls, the controller 702 may be configured to use different access protocols to manage the number of API calls in a day. Notably, for Salesforce.com, API-based synchronization sessions (e.g., SOAP APIs) consume more API calls than bulk-based synchronization sessions. For example, each API-based synchronization may consumer about 4-20 API calls, depending on the number of object types to synchronize in the API-based synchronization session. The bulk-based synchronization session uses a few API calls because it groups the data into big batches (up to 10,000 per batch). The bulk-based synchronization session will synchronize all the change-data since the last real-time synchronization session.

In some embodiments, the controller 702 is configured to use an API-based synchronization session when a real-time synchronization process is triggered, e.g., when the number of change-data events within a synchronization period has occurred. Thus, a lower count value will consume more API calls than a higher count value. On the other hand, a lower count value will update the external service provider systems 122 closer to real-time. In some embodiments, the controller 702 is configured to use a bulk-based synchronization session when a time-based synchronization trigger occurs, e.g., a maximum time period elapses.

If an external service provider system 122 has a lower API limit, the controller 702 can be configured to trigger an API-based synchronization session in response to a higher change-data count value (e.g. 100), and a bulk-based synchronization session in response to a lower maximum time period between synchronization sessions (e.g., 15 or 30 minutes).

In some embodiments, the controller 702 may be configured to trigger more API-based synchronization sessions during busy hours to achieve almost real-time synchronization, may be configured to trigger fewer API-based synchronization sessions during less-busy hours to achieve near real-time synchronization, and more bulk-based synchronization sessions after hours to achieve scheduled synchronization. In some embodiments, it may be advantageous when many transactions are about to take place, e.g., before a massive bill run, to configure the controller 702 to employ scheduled trigger conditions (and bulk synchronization) to avoid running out of the API calls too quickly.

To ensure healthy operation, the controller 702 may perform a bulk synchronization when the following conditions occur:

Object and field migration: When customers upgrade to a newer version of the multi-tenant system 106, and an object-level or field-level data migration synchronization is needed.

Switching from a scheduled synchronization mode to a real-time synchronization mode: After switching from scheduled synchronization mode to a real-time synchronization mode, a bulk synchronization may be automatically executed before the first API-based synchronization session is triggered.

Clean Up operation: In real-time synchronization mode, after a clean-up, a bulk synchronization will be automatically executed before the first real-time synchronization session is triggered.

In some embodiments, the controller 702 may be configurable to operate in a variety of synchronization modes, e.g., scheduled mode, real-time mode, near real-time mode, etc. In some embodiments, the synchronization mode may be selectable by a user.

Figure 8:
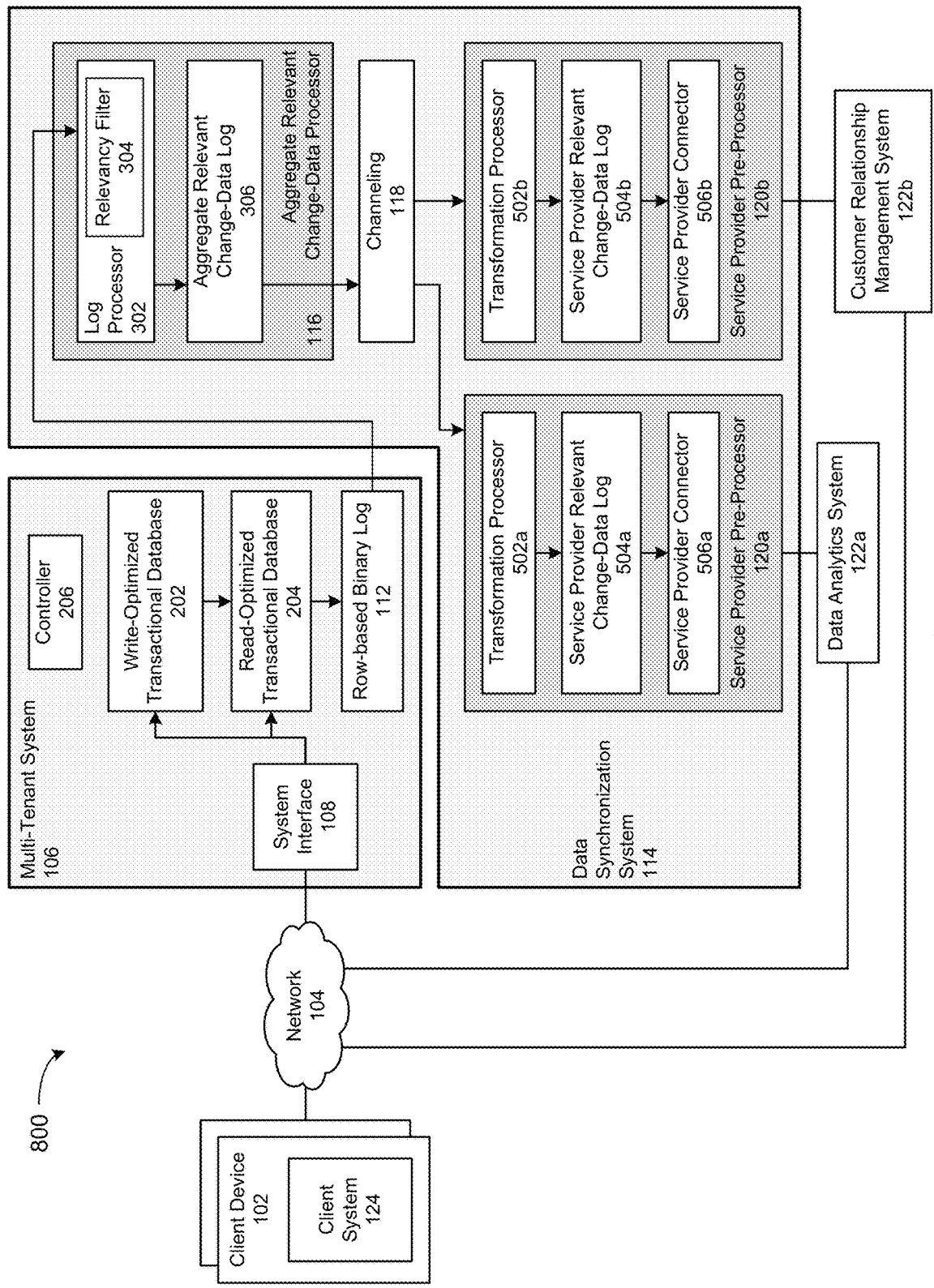
FIG. 8 is a block diagram illustrating details of a network system for providing a shared services to multiple tenants and for synchronizing change-data with two external service provider systems, in accordance with some embodiments of the invention.

FIG. 8 is a block diagram illustrating details of a network system 800 for providing a shared services to multiple tenants and for synchronizing change-data with two external service provider systems 122, in accordance with some embodiments of the invention. As shown, the client devices 102 are coupled to the network 104, which in turn is coupled to the system interface 108 of the multi-tenant system 106, to a first external service provider system 122 (namely, data analytics system 122a), and to a second external service provider system 122 (namely, a customer relationship management system 122b). The system interface 108 is coupled to the write-optimized transactional database 202, and to the read-optimized transactional database 204. The write-optimized transactional database 202 is coupled to the read-optimized transactional database 204 for replication purposes. The read-optimized transactional database 204 is coupled to the row-based binary log 112, for recording change data of transaction events. The controller 206 may control replication of the write-optimized transactional database 202 and may control generation of the row-based binary log 112.

The log processor 304 with a relevancy filter 304 of the aggregate relevant change-data processor 116 is coupled to the row-based binary log 112 for generating an aggregate relevant change-data log 306. Channeling 118 couples the aggregate relevant change-data log 306 to a first service provider pre-processor 120a (which is associated with the data analytics system 122a), and to a second service provider pre-processor 120b (which is associated with the customer relationship management system 122b). The first service provider pre-processor 120a includes a first transformation processor 502a for generating a first service provider relevant change-data log 504a (change-data that is relevant to the data analytics system 122a), and a first service provider connector 506a for performing synchronization sessions with the data analytics system 122a in response to one or more trigger conditions (trigger conditions that may be customized for the data analytics system 122a). The second service provider pre-processor 120b includes a second transformation processor 502b for generating a second service provider relevant change-data log 504b (change-data that is relevant to the customer relationship management system 122b), and a second service provider connector 506b for performing synchronization sessions with the customer relationship management system 122*b* in response to one or more trigger conditions (trigger conditions that may be customized for the customer relationship management system 122*b*).

In some embodiments, the transformation processors 502*a* and 502*b* processes the change-data into a data format and schema appropriate to its respective external service provider system 122, which may differ between external service provider systems 122*a* and 122*b*.

Figure 9:
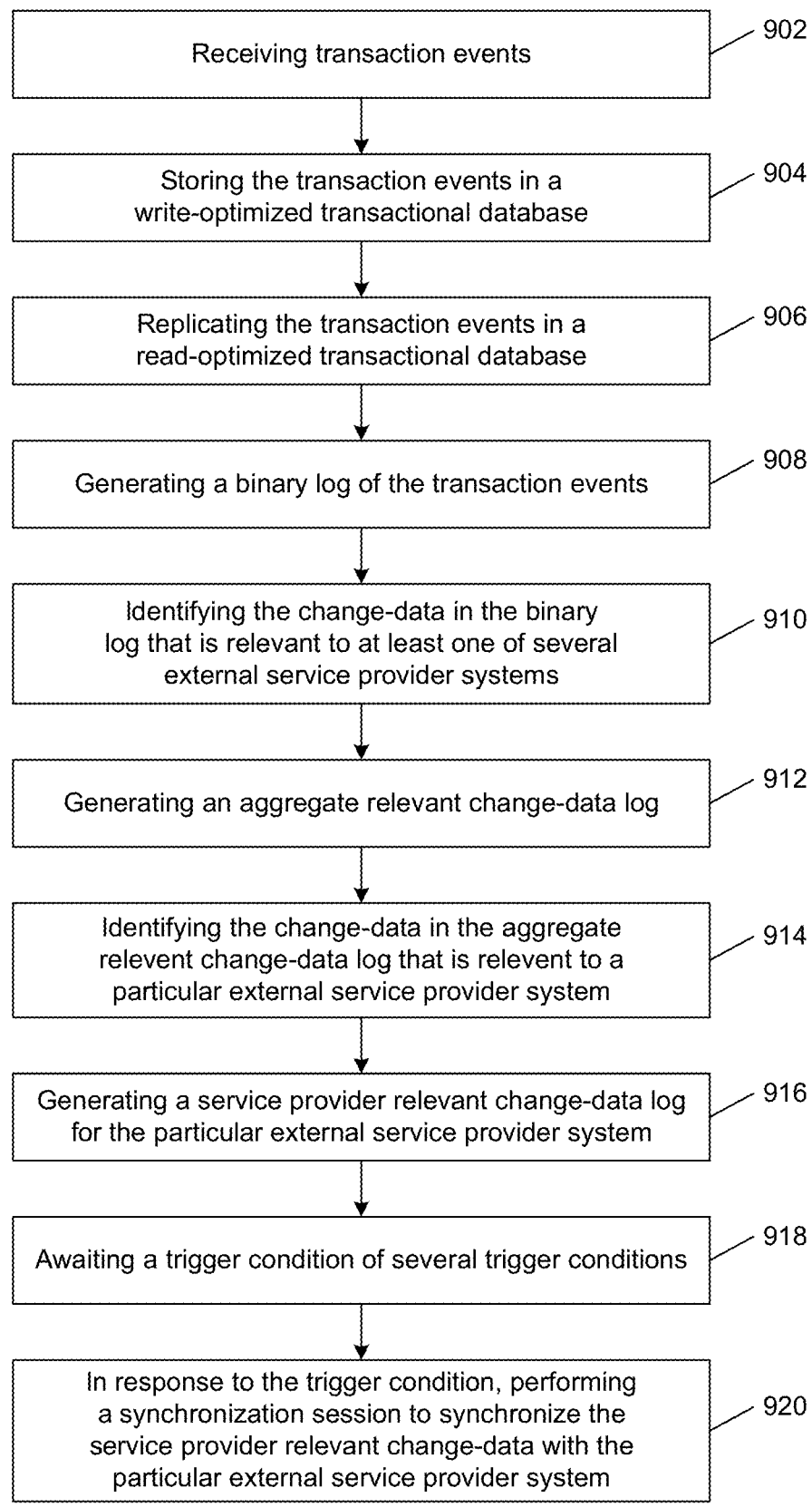
FIG. 9 is a flowchart illustrating details of a method of synchronizing change-data in the multi-tenant billing system with an external service provider system, in accordance with some embodiments of the invention.

FIG. 9 is a flowchart illustrating details of a method 900 of synchronizing data in the multi-tenant billing system with an external service provider system, in accordance with some embodiments of the invention. The method 900 begins in step 902 with the system interface 108 receiving transaction events. In step 904, the write-optimized transactional database 202 in step 904 stores the data changes caused by the transaction events. In step 906, the controller 206 replicates the change-data in the read-optimized transactional database 204. In step 908 the controller 206 generates a transaction log, e.g., the row-based binary log 112, of the change-data. In step 910, the log processor 302 (e.g., a master stage of a tungsten replicator) uses the aggregate service provider relevancy filter 304 to identify the change-data in the binary log 112 that is relevant to at least one of the one or more external service provider systems 122. In step 912, the log processor 302 generates the aggregate relevant change-data log 306. In step 914, the transformation processor 508 (e.g., a slave stage of a tungsten replicator) uses the service provider specific relevancy filter 508 to identify the aggregate relevant change-data in the aggregate relevant change-data log 306 that is relevant to the particular external service provider system 122 associated with it. In step 916, the transformation processor generates a service provider relevant change-data log 504 for the particular external service provider system 122. In step 918, the service provider connector 506 awaits a trigger condition of one or more trigger conditions. In some embodiments, at least one of the one or more trigger conditions includes a real-time trigger condition. In step 920, the service provider connector 506, in response to the trigger condition, performs a synchronization event to synchronize the service provider relevant change-data with the particular external service provider system 122.

In some embodiments of the method 900, the multi-tenant system 106 may be a subscription billing system, and the particular external service provider system 122 may be one of a data warehouse system, a customer relationship management system or a data analysis system. The one or more trigger conditions may include a first trigger condition based on the number of data changes that occurred, and a second trigger condition based on a clock-based time schedule. The one or more external service provider systems 122 may include two particular external service provider systems 122, and each of the two particular external service provider systems 122 may have different trigger conditions. The particular external service provider system may have an API-call limit, and the trigger condition may be configured to account for the API-call limit.

Figure 10:
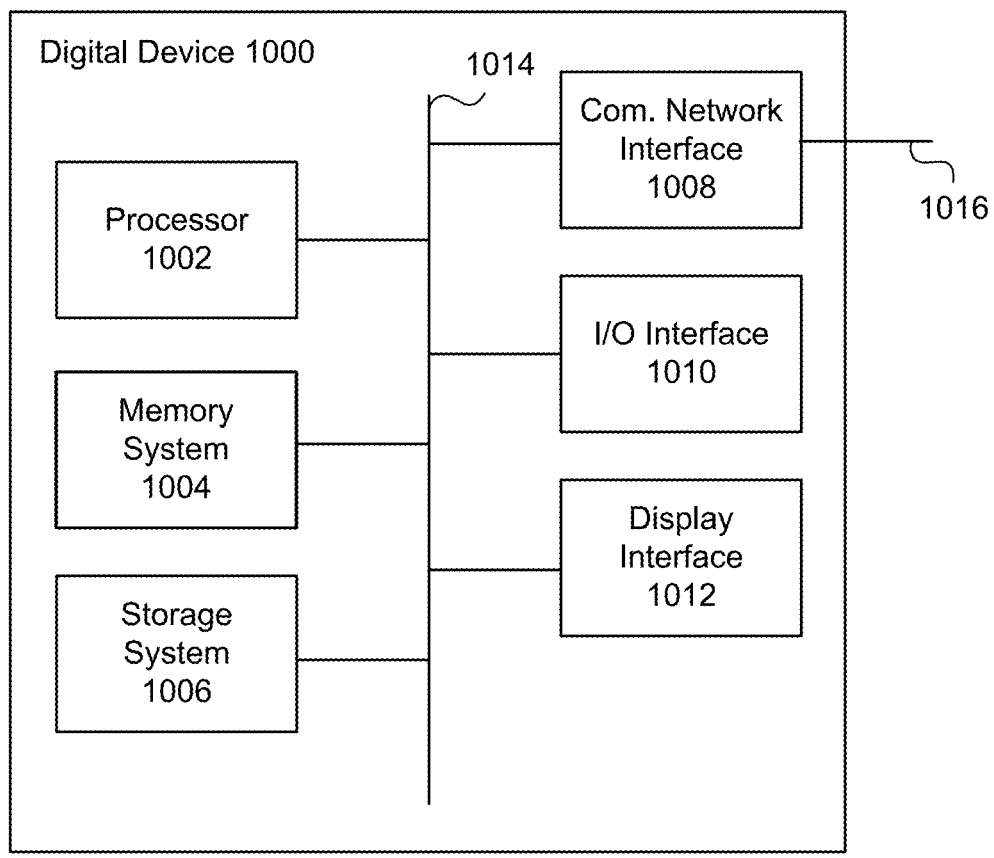
FIG. 10 is a block diagram illustrating details of a digital device, in accordance with some embodiments of the invention.

FIG. 10 is a block diagram illustrating details of a digital device 1000, in accordance with some embodiments of the invention. Any of the client device 102, multi-tenant system 106, data synchronization system 114, aggregate relevant change-data processor 116, and/or service provider preprocessor 120 may include and/or be implemented on one or more digital devices 1000. The digital device 1000 comprises a processor 1002, a memory system 1004, a storage system 1006, a communication network interface 1008, an I/O interface 1010, and a display interface 1012 communicatively coupled to a bus 1014. The processor 1002 is configured to execute executable instructions (e.g., programs). In some embodiments, the processor 1002 comprises circuitry or any processor capable of processing the executable instructions.

The memory system 1004 is any memory configured to store data. Some examples of the memory system 1004 are storage devices, such as RAM or ROM. The memory system 1004 can comprise the RAM cache. In various embodiments, data is stored within the memory system 1004. The data within the memory system 1004 may be cleared or ultimately transferred to the storage system 1006.

The storage system 1006 is any storage configured to retrieve and store data. Some examples of the storage system 1006 are flash drives, hard drives, optical drives, and/or magnetic tape. In some embodiments, the digital device 1000 includes a memory system 1004 in the form of RAM and a storage system 1006 in the form of flash data. Both the memory system 1004 and the storage system 1006 comprise computer readable media which may store instructions or programs that are executable by a computer processor including the processor 1002. The storage system 1006 may comprise non-transitory media. One skilled in the art will recognize that, although the storage system 1006 and memory system 1004 are illustrated as different units, the storage system 1006 and memory 1004 can be parts of the same unit, distributed units, virtual memory, etc.

The communications network interface (com. network interface) 1008 can be coupled to a network via the link 1016. The communication network interface 1008 may support communication over an Ethernet connection, a serial connection, a parallel connection, or an ATA connection, for example. The communication network interface 1008 may also support wireless communication (e.g., 802.11 a/b/g/n, WiMax). It will be apparent to those skilled in the art that the communication network interface 1008 can support many wired and wireless standards.

The input/output (I/O) interface 1010 is any device that receives input from the user and/or outputs data. The display interface 1012 is any device that is configured to output graphics and data to a display. In one example, the display interface 1012 is a graphics adapter.

It will be appreciated by those skilled in the art that the hardware elements of the digital device 1000 are not limited to those depicted in FIG. 10. A digital device 1000 may comprise more or less hardware elements than those depicted. Further, hardware elements may share functionality and still be within various embodiments described herein. In one example, encoding and/or decoding may be performed by the processor 1002 and/or a co-processor located on a GPU (i.e., Nvidia®).

One skilled in the art will recognize that the digital device 1000 may also include additional information, such as network connections, additional memory, additional processors, LANs, input/output lines for transferring information across a hardware channel, access to the Internet or an intranet, etc. One skilled in the art will also recognize that the programs and data may be received by and stored in the system in alternative ways. For example, a computer-readable storage medium (CRSM) reader such as a magnetic disk drive, hard disk drive, Flash drive, CPU, etc. may be coupled to the bus 1014 for reading a computer-readable storage medium (CRSM) such as a magnetic disk, a hard disk, a magneto-optical disk, RAM, etc. Accordingly, the digital device 1000 may receive programs and/or data via the CRSM reader. Further, it will be appreciated that the term "memory" herein is intended to cover all data storage media whether permanent or temporary.

The use of the terms "a", "an" and "the" and similar articles are to be construed as covering both the singular and the plural, unless otherwise indicated herein or contradicted by context. The terms "having", "including", "containing" and similar terms listing elements are to be construed as open-ended (e.g., "including but not limited to") unless otherwise noted. Recitation of ranges of values are intended to serve as a shorthand of referring individually to each separate value, whole or fraction, within the range, unless otherwise indicated herein. All methods described herein can be performed in any order unless otherwise indicated herein or contradicted by context. The use of any and all examples is intended to better illuminate embodiments of the invention and not to limit the scope of the patent to the particular example.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting.

The invention claimed is:

1. A method of synchronizing change-data in a multi-tenant system with one or more external service provider systems, the method comprising:
    receiving transaction events in a write-optimized transactional database of a multi-tenant system;
    replicating the transaction events in a read-optimized transactional database;
    generating a transaction log of change-data from the read-optimized transactional database;
    identifying the change-data in the transaction log that is relevant to at least one of one or more external service provider systems;
    generating an aggregate relevant change-data log based on the change-data relevant to the at least one of the one or more external service provider systems;
    identifying change-data in the aggregate relevant change-data log that is relevant to a particular external service provider system of the one or more external service provider systems;
    generating a service provider relevant change-data log based on the change-data relevant to the particular external service provider system;
    awaiting a trigger condition of one or more trigger conditions, at least one of the one or more trigger conditions including a real-time trigger condition; and
    in response to the trigger condition, performing a synchronization session to synchronize the change-data relevant to the particular external service provider system with the particular external service provider system.

2. The method of claim 1, wherein the multi-tenant system is a subscription billing system, and wherein the particular external service provider system is one of a data warehouse system, a customer relationship management system, or a data analysis system.

3. The method of claim 1, wherein the transaction log is a binary log.

4. The method of claim 3, wherein the binary log is a row-based binary log.

5. The method of claim 1, wherein the step of generating the aggregate relevant change-data log is performed by a master stage of a tungsten replicator.

6. The method of claim 5, wherein the step of generating the service provider relevant change-data log is performed by a slave stage of the tungsten replicator.

7. The method of claim 1, wherein the trigger condition includes a real-time trigger condition.

8. The method of claim 1, wherein the one or more trigger conditions includes a first trigger condition based on a number of data changes that occurred, and a second trigger condition based on a clock-based time schedule.

9. The method of claim 1, wherein the one or more external service provider systems include two particular external service provider systems, and each of the two particular external service provider systems have different trigger conditions.

10. The method of claim 1, wherein the particular external service provider system has an API-call limit, and wherein the trigger condition is configured to account for the API-call limit.

11. A system for synchronizing change-data in a multi-tenant system with one or more external service provider systems, the system comprising:
    memory;
    at least one processor;
    a system interface of a multi-tenant system, the system interface executable by the at least one processor and configured to receive transaction events;
    a write-optimized transactional database for recording the transaction events;
    a read-optimized transactional database that is replicated from the write-optimized transactional database;
    a transaction log of change-data that is generated from the read-optimized transactional database;
    a first change-data engine executable by the at least one processor and configured to identify the change-data in the transaction log that is relevant to at least one of one or more external service provider systems, and to generate an aggregate relevant change-data log based on the change-data relevant to the at least one of the one or more external service provider systems;
    a second change-data engine executable by the at least one processor and configured to identify change-data in the aggregate relevant change-data log that is relevant to a particular external service provider system of the one or more external service provider systems, and to generate a service provider relevant change-data log based on the change-data relevant to the particular external service provider system;
    a service provider connector executable by the at least one processor and configured to await a trigger condition of one or more trigger conditions, at least one of the one or more trigger conditions including a real-time trigger condition, and after the trigger condition to perform a synchronization session to synchronize the change-data relevant to the particular external service provider system with the particular external service provider system.

12. The system of claim 11, wherein the multi-tenant system is a subscription billing system, and wherein the particular external service provider system is one of a data warehouse system, a customer relationship management system, or a data analysis system.

13. The system of claim 11, wherein the transaction log is a binary log.

14. The system of claim 13, wherein the binary log is a row-based binary log.

15. The system of claim 11, wherein the first change-data engine includes a master stage of a tungsten replicator.

16. The system of claim 15, wherein the second change-data engine includes a slave stage of the tungsten replicator.

17. The system of claim 11, wherein the trigger condition includes a real-time trigger condition.

18. The system of claim 11, wherein the one or more trigger conditions includes a first trigger condition based on a number of data changes that occurred, and a second trigger condition based on a clock-based time schedule.

19. The system of claim 11, wherein the one or more external service provider systems include two particular external service provider systems, and each of the two particular external service provider systems have different trigger conditions.

20. The system of claim 11, wherein the particular external service provider system has an API-call limit, and wherein the trigger condition is configured to account for the API-call limit.

* * * * *